(12) United States Patent
Oshima

(10) Patent No.: US 6,628,896 B2
(45) Date of Patent: Sep. 30, 2003

(54) MOTORIZED SINGLE USE CAMERA

(75) Inventor: Shigeru Oshima, Chofu (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 10/006,105

(22) Filed: Dec. 4, 2001

(65) Prior Publication Data

US 2003/0103768 A1 Jun. 5, 2003

(51) Int. Cl.⁷ .................. G03B 17/02; G03B 1/00
(52) U.S. Cl. .................. 396/6; 396/539; 396/413
(58) Field of Search .................. 396/6, 539, 387, 396/413

(56) References Cited

U.S. PATENT DOCUMENTS

| | | |
|---|---|---|
| 4,833,495 A | 5/1989 | Ohmura et al. |
| 4,855,774 A | 8/1989 | Ohmura et al. |
| 4,884,087 A | 11/1989 | Mochida et al. |
| 4,954,857 A | 9/1990 | Mochida et al. |
| 4,972,649 A | 11/1990 | Mochida et al. |
| 5,063,400 A | 11/1991 | Takei et al. |
| 5,170,199 A | 12/1992 | Nakai et al. |
| RE34,168 E | 1/1993 | Ohmura et al. |
| 5,181,057 A | 1/1993 | Takagi et al. |
| 5,235,364 A | 8/1993 | Ohmura et al. |
| 5,311,231 A | 5/1994 | Suzuki et al. |
| 5,315,332 A | 5/1994 | Hirasaki et al. |
| 5,349,410 A | 9/1994 | Kamata |
| 5,361,111 A | 11/1994 | Yamashina et al. |
| 5,381,200 A | 1/1995 | Takagai |
| 5,408,288 A | 4/1995 | Ogura et al. |
| 5,432,572 A | 7/1995 | Hirasaki et al. |
| 5,436,685 A | 7/1995 | Yamashina |
| 5,537,176 A | 7/1996 | Hara et al. |
| 5,548,364 A | 8/1996 | Muramatsu et al. |
| 5,576,793 A | 11/1996 | Hara et al. |
| 5,608,486 A | 3/1997 | Takagi et al. |
| 5,634,164 A | 5/1997 | Isozaki |
| 5,752,085 A | * 5/1998 | Cloutier et al. ............. 396/538 |
| 5,890,024 A | * 3/1999 | Naka et al. ................. 396/395 |

* cited by examiner

*Primary Examiner*—Russell Adams
*Assistant Examiner*—Andrew Sever
(74) *Attorney, Agent, or Firm*—Senniger, Powers, Leavitt & Roedel

(57) ABSTRACT

A single use camera which has a motor to advance film comprising a light-tight casing having an exposure aperture through which exposures are made, an unexposed film wound up around a pre-winding take-up spool disposed on one side of the exposure aperture, a removable film cartridge having a film take-up spool therein disposed on the opposite side of the exposure aperture from the pre-winding take-up spool, a motor to pre-wind the unexposed film around the pre-winding take-up spool beforehand and to wind exposed frames of the film back to the removable film cartridge. The motorized single use camera uses the built-in motor for all the film windings so that any special film loading device to roll up the unexposed film beforehand outside of the camera in a dark room is not required, and the same motor can be used for film winding after each exposure so that any manual film winding mechanism is not required.

5 Claims, 7 Drawing Sheets

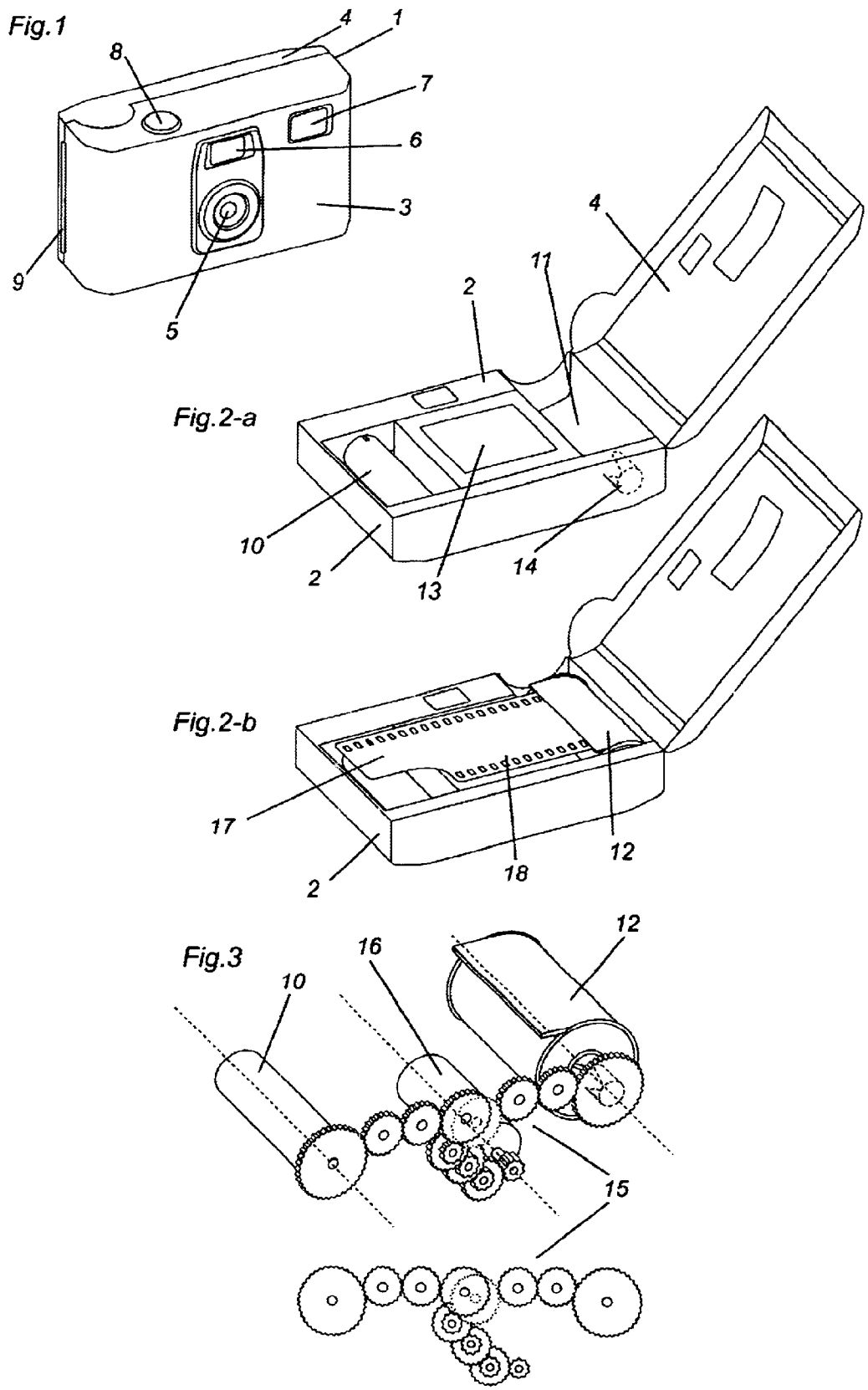

Fig.4
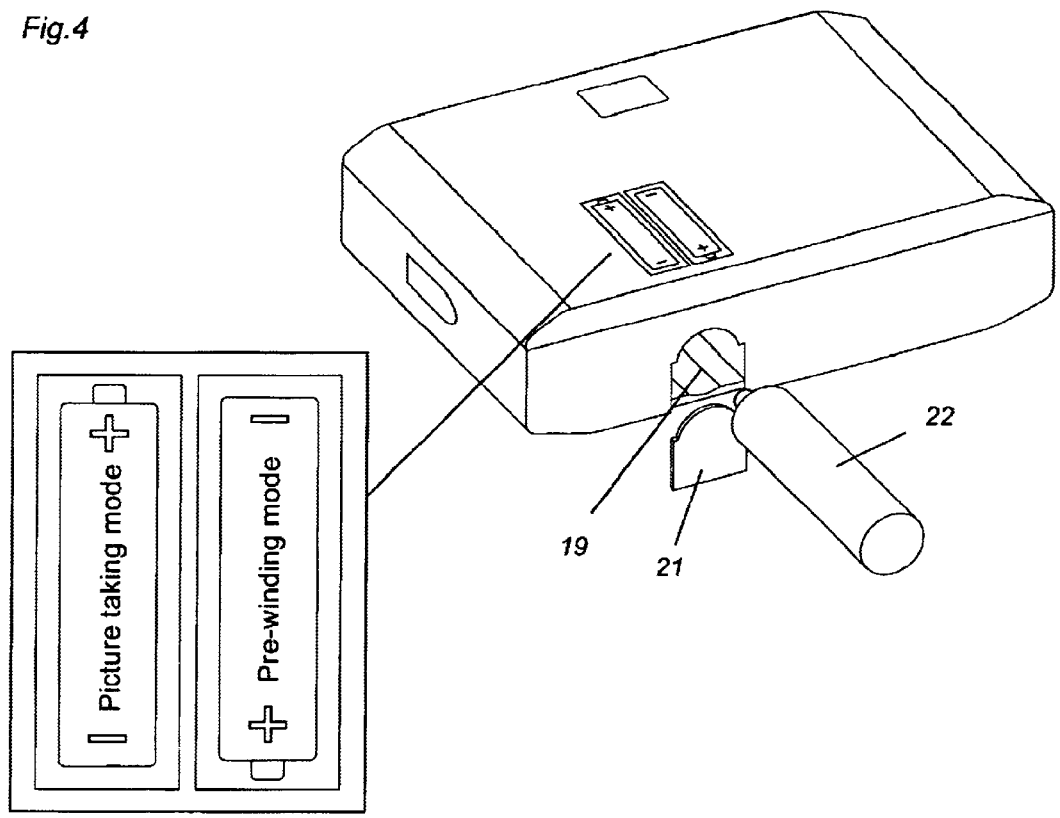
Fig.4-a
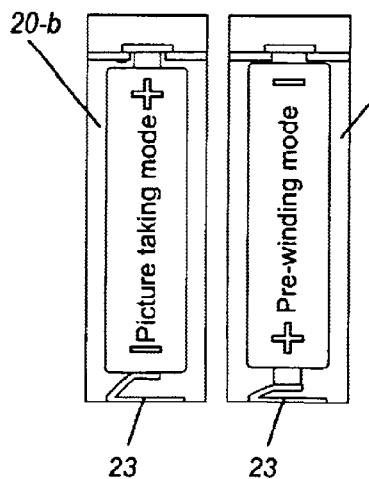
Fig.4-b
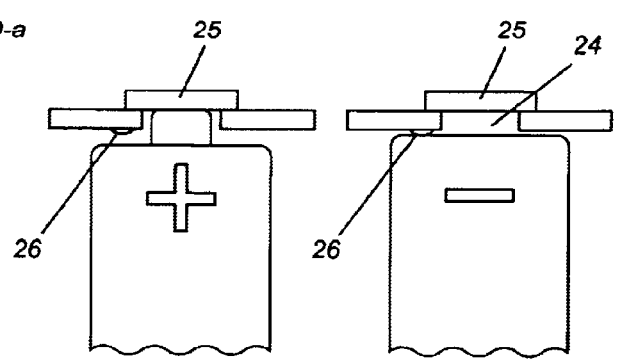

Fig.5
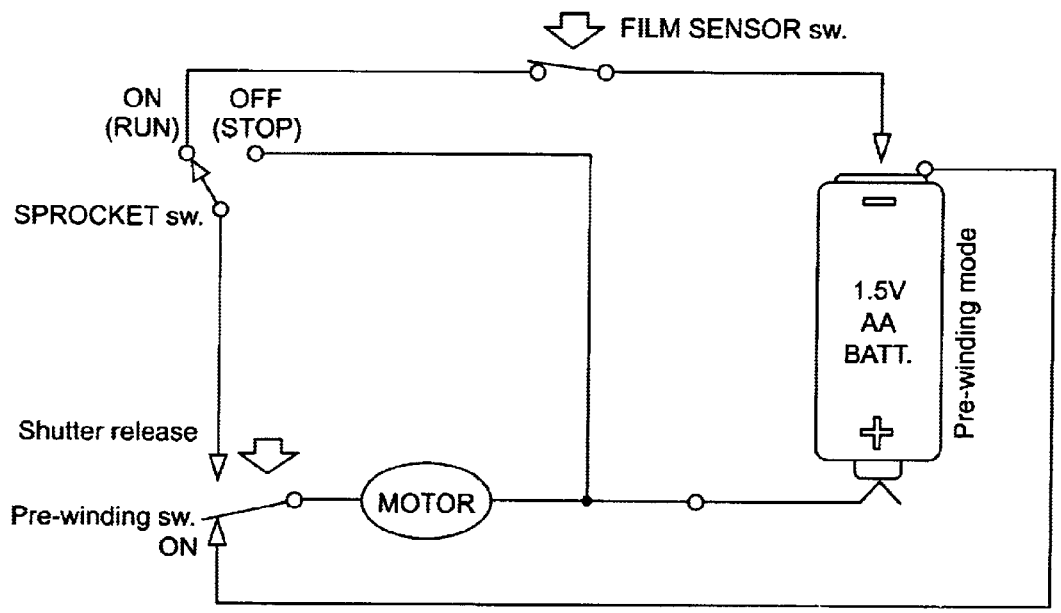
Fig.5-a
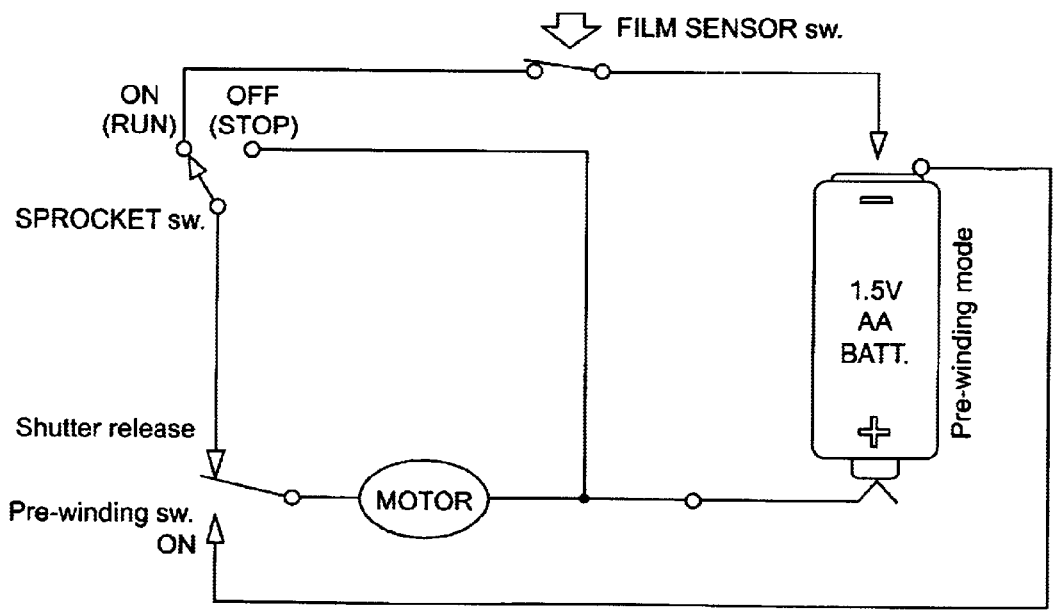

Fig.5-b
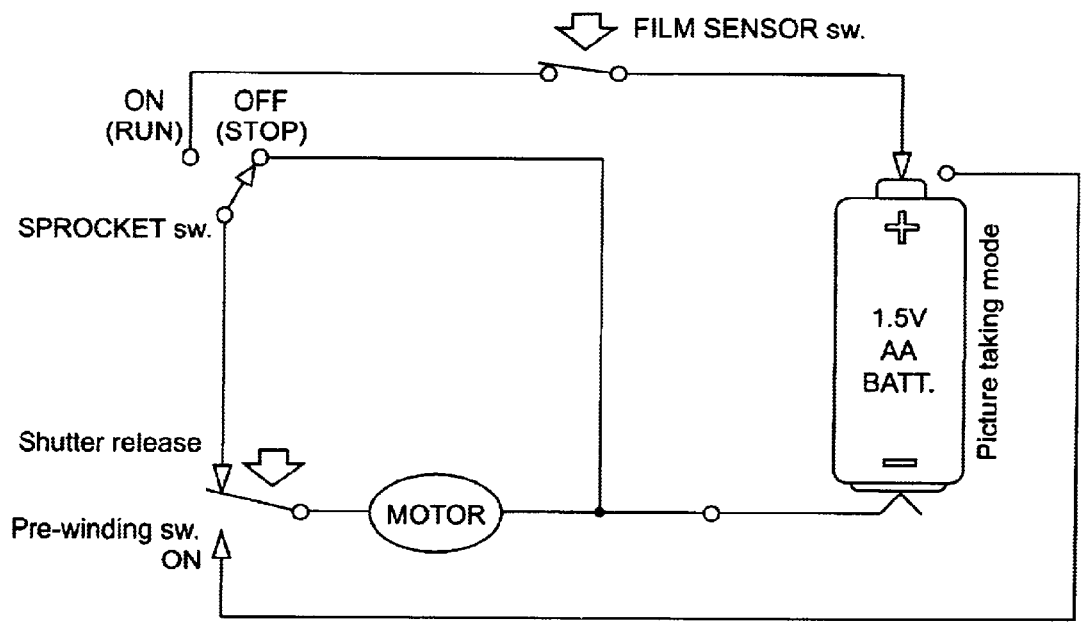
Fig.5-c
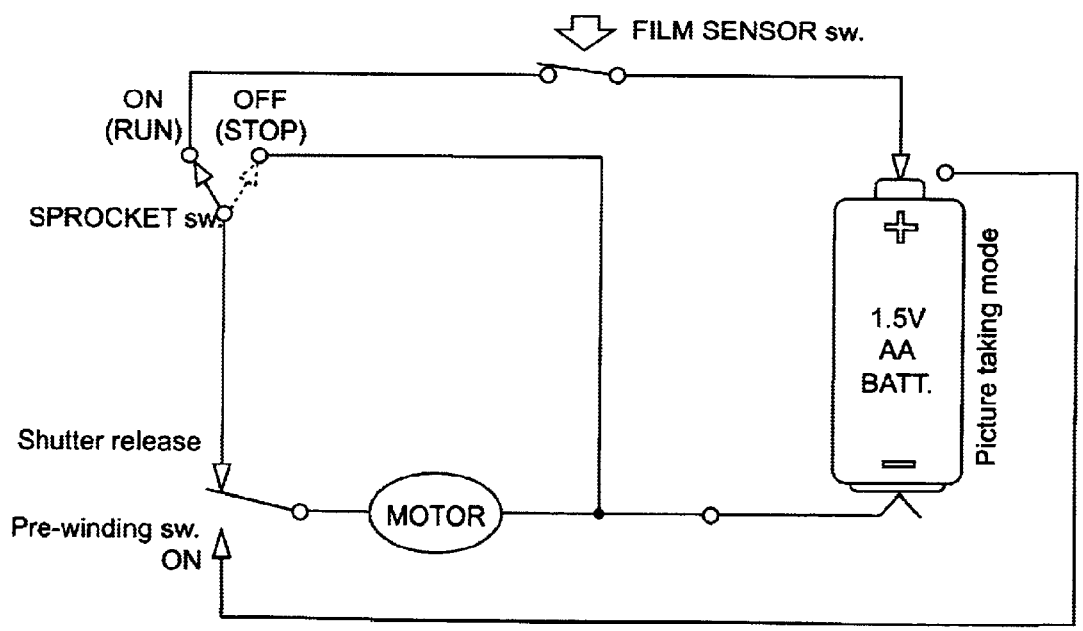

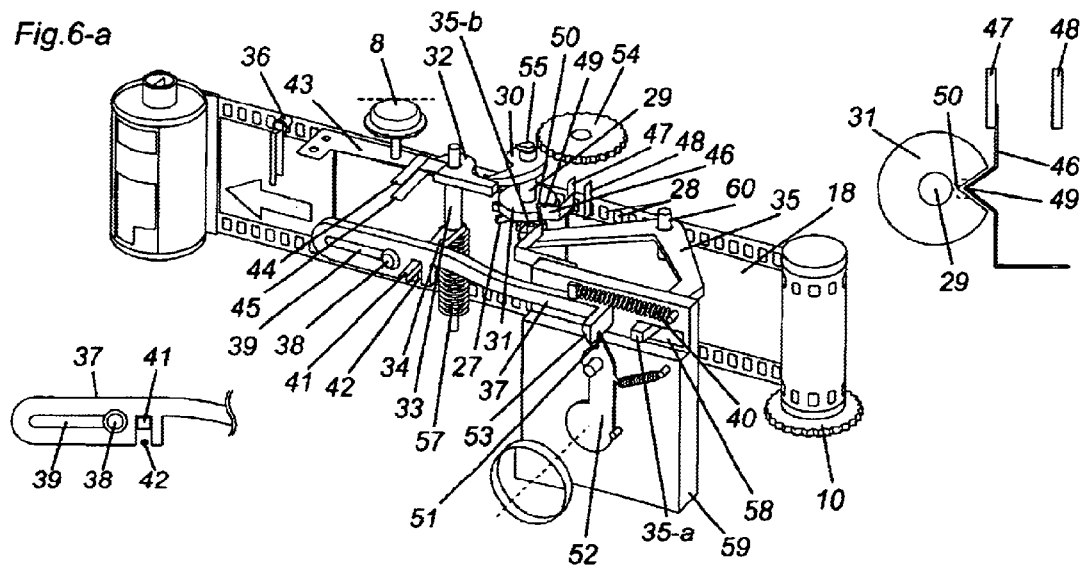
Fig.6-a
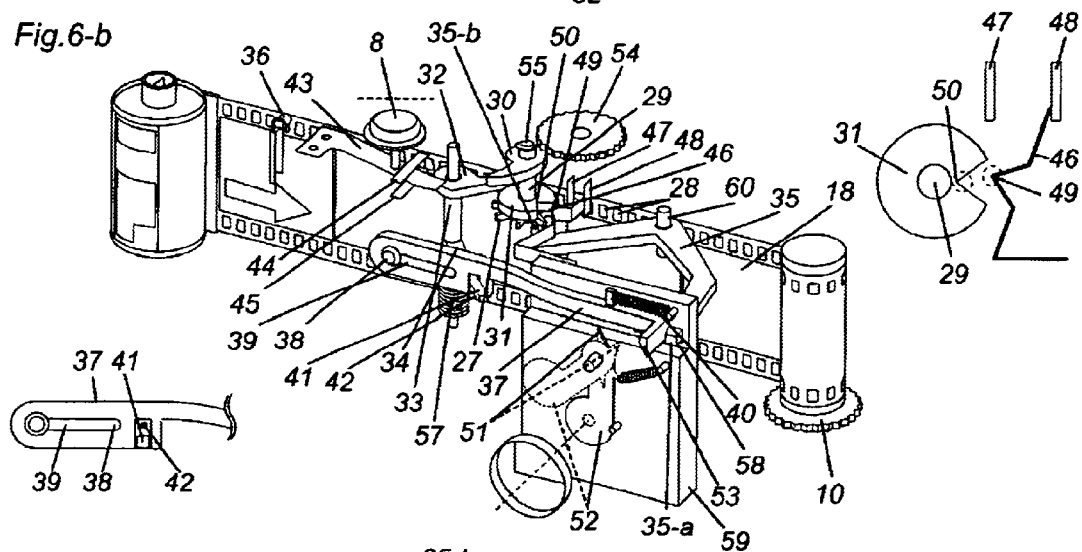
Fig.6-b
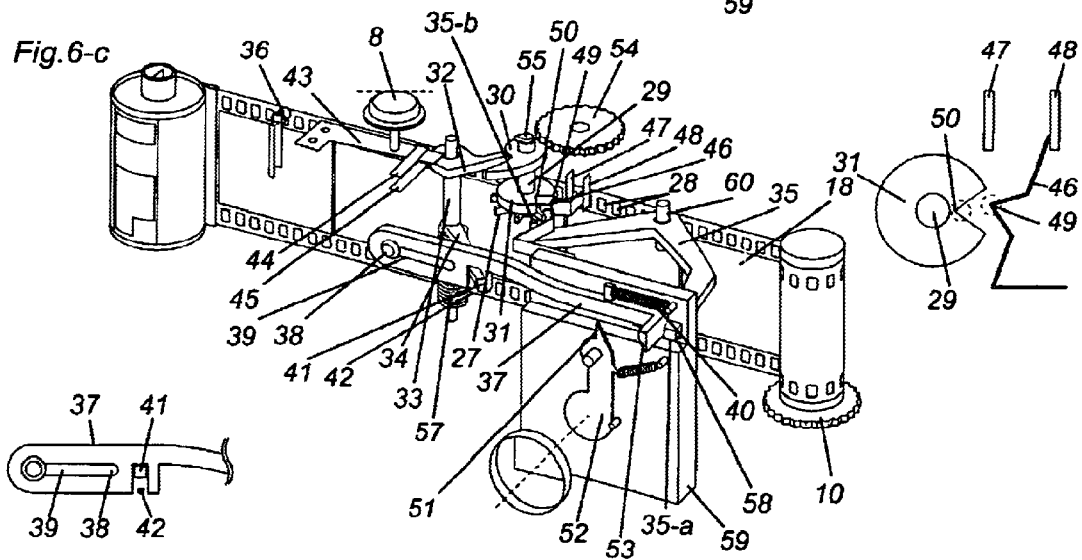
Fig.6-c

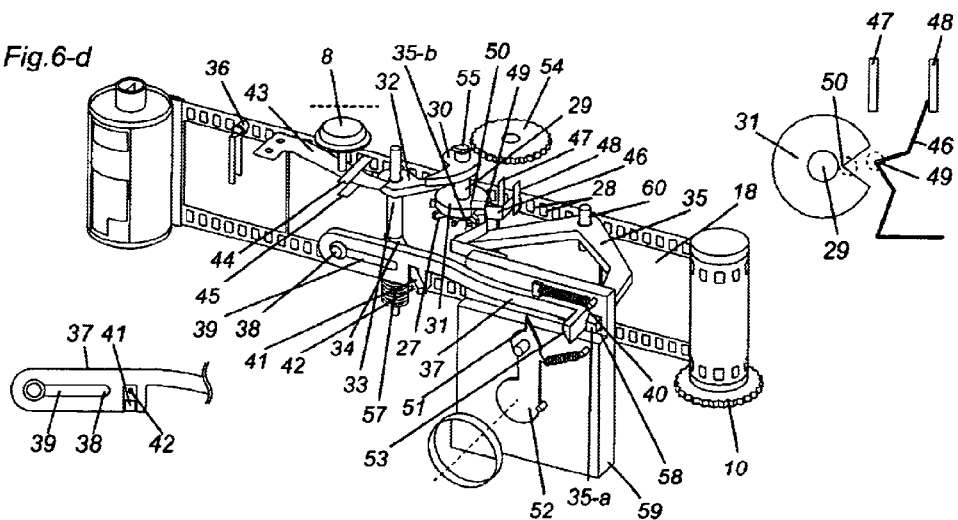
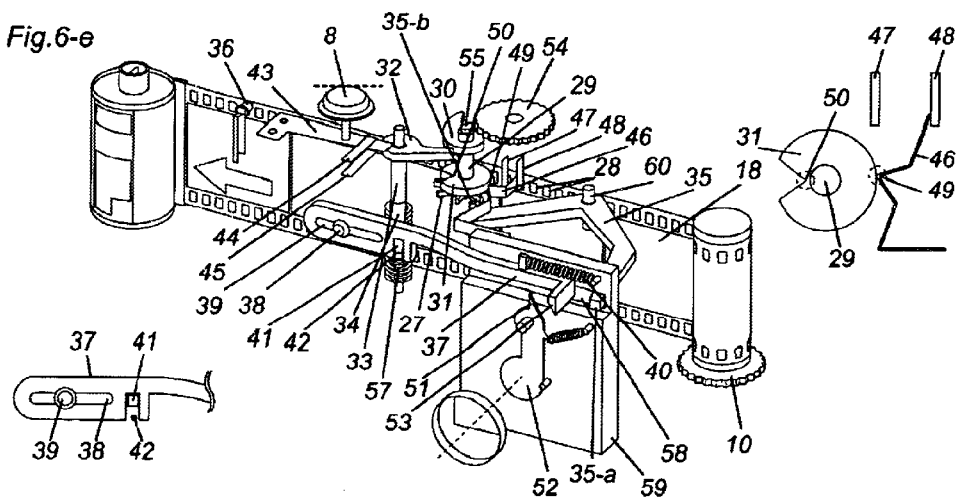
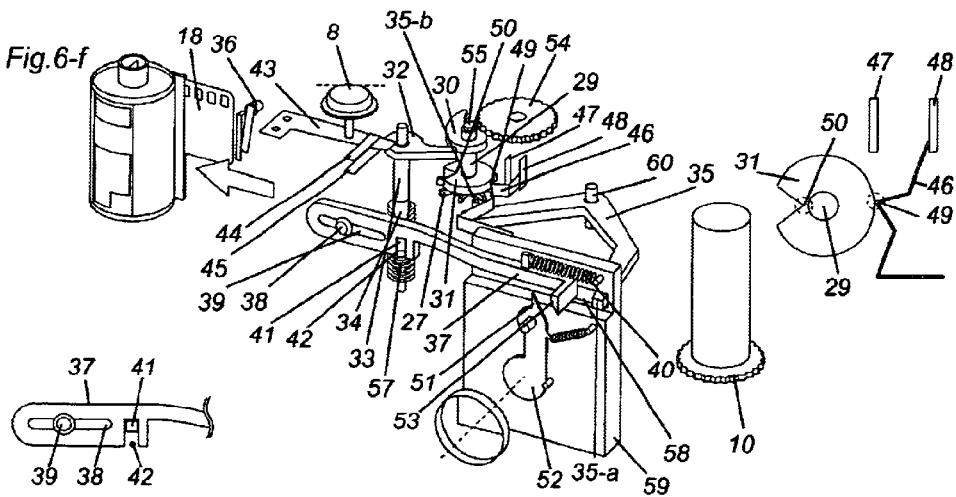

MOTORIZED SINGLE USE CAMERA

FIELD OF THE INVENTION

The present invention relates to a single use camera, which is previously loaded with a photographic film, namely a 135 size roll film, and into which simple exposure mechanisms such as a taking lens, a shutter, and a film advancing mechanism are built. The present invention relates especially to a single use camera of which film-advancing mechanism and also previous film loading are driven by a built-in motor and relates particularly to a construction of camera casing from which exposed film can be removed easily without destroying any part of camera body to enable manufacturers to recycle cameras without any additional parts or modifications for recycling.

BACKGROUND OF THE INVENTION

Single use cameras are now very popular on the market today. They are loaded with an unexposed film previously and the film is to be wound back after each exposure to a removable cartridge also provided in the camera, and purposed to enable users to take pictures whenever they like without buying expensive cameras. However, these single use disposable cameras are not recyclable due to its body construction, from which exposed film cannot be removed unless a part of the body is destroyed. Further more, the way of previous loading of film into the camera is quite complicated.

As disclosed in U.S. Pat. Nos. 4,884,087 and 4,972,649 single use disposable cameras are assembled usually by the steps of winding a film withdrawn from a film cartridge (patrone) in a roll in a dark room; loading the rolled film and the film cartridge in respective receiving chambers formed in a main body section of the single use camera; fitting a back cover to the main body so as to close light-tightly the single use camera; and sealing the single use camera so that it cannot be opened. To carry out the steps mentioned above, it is necessary to provide a special film loading device which is very complicated in mechanism and also necessary for all the steps to be done in a dark room. As is well known, such a dark room film handling is quite troublesome.

Further more the back door of the conventional single use camera is sealed light-tightly, so unless the light-tight film casing is destroyed to open the same the exposed film cannot be removed out of the camera. These two things, namely pre-winding film in a roll using the special film loading device in a dark room and the light-tight film casing which must be destroyed for removing exposed film out of the camera unable manufacturers or photofinishers to recycle the single use camera easily. For ordinary users it is impossible to follow the steps as mentioned above. So the conventional single use cameras on the market today are not recyclable, and only some of the components can be reused for a new single use camera.

If a single use camera, like the single use camera of the present invention, has a built-in motor by which the film can be easily pre-wound over the film pre-winding take-up spool in daylight without any help of special jig like film loading device from the outside of the camera, the single use camera can be easily loaded again with a new film in daylight also by using the motor. And if a sort of back door is provided with the single use camera, the exposed film can be easily removed out of the camera without destroying any part of the camera body, and the manufacturers or photofinishers can recycle such single use cameras without any problem.

In the case of the single use camera of the present invention, the manufacturers or photofinishers need not provide such a costly instrument like film loading device to be used in a darkroom and need not destroy any part of the single use camera, and easily can re-load the single use cameras with new films very cheaply in daylight. Even for individual users it can be done without any special tooling.

Further more if the same built-in motor can wind the film up automatically after each exposure eliminating manual film winding mechanism, the handling of the single use camera will be far much more convenient in comparison with conventional manual winding single use cameras.

OBJECTS OF THE INVENTION

It is, therefore, an object of the present invention to provide a single use camera which has a built-in motor with which film pre-winding and film-reloading can be made quite easily without using any kind of mechanical help from the outside of the camera.

It is another object of the present invention to provide a single use camera which has a built-in motor with an automatic film winding mechanism, which is a specially designed simple mechanism for switching the film driving directions from pre-winding to ordinary film advance winding or reverse way, and also for controlling the sprocket wheel and shutter charging and releasing.

Still another object of the present invention is to provide a single use camera that has a sort of back door, which can be opened easily for removing the exposed film out of the camera without destroying any part of the camera.

SUMMARY OF THE INVENTION

To achieve the above objects, the single use camera according to the present invention comprises a main body having an exposure opening; a motor built-in the main body to pre-wind film or to wind back film; a film pre-winding take-up spool around which unexposed film is rolled up by the motor disposed on one side of exposure opening in the main body; a removable film cartridge having a film winding spool therein, into the slot of which the end of the film is inserted and fixed, disposed on the other side of exposure opening in the said main body; a film winding member which is driven by the motor built in the said main body for pre-winding the unexposed film around the film pre-winding take-up spool and for winding back exposed frames into the film cartridge; a shutter-sprocket wheel control means which controls the exposure and the film winding member; a back cover which is fixed to the main body from the rear side with a hinge and can be closed and opened by a lock-unlock means; and a front cover to be fixed onto the main body from the front side to make the whole camera body into a light-tight casing together with the closed back cover.

According to the present invention, a new unexposed film is pre-wound around the film pre-winding take-up spool, and the unexposed film is wound back around the film spool of the film cartridge by one frame after each exposure. And the motor built in the main body drives both the pre-winding of the unexposed film and the winding back of the exposed film. When the exposure of all frames of the film has been completed, the film is fully wound back into the film cartridge, and by opening the back door the film can be removed from the single use camera in daylight. In the case of the single use camera of the present invention, it is not necessary to destroy any part of the single use camera to remove the exposed film out of the camera.

Generally speaking conventional 35 mm compact cameras with motorized film driving use the film winding to rotate the sprocket wheel to count the perforations and stop the motor running after one frame of the film has been advanced. Simultaneously the rotation of the sprocket wheel is used for shutter charging. Consequently after one shutter releasing, and while the film is moving, the sprocket wheel is always rotating coupling with the film running and at the same time shutter is being charged also coupling with the sprocket rotation. Therefore in the case of conventional 35 mm motor driven compact cameras for rewinding the film after the entire film has been exposed or for pre-winding an unexposed film, it is always necessary to provide a switch to change the rotation of the motor rotation or to switch the direction of film running with a rather complicatedly constructed clutch mechanism having the sprocket wheel be free from shutter charging. Otherwise if the film running direction is switched from picture taking to pre-winding or rewinding direction, the sprocket wheel will be stuck because of shutter charging mechanism, which does not move in the direction of pre-winding or rewinding of the film.

In the single use camera of the present invention the built-in motor is used for pre-winding the unexposed film withdrawn from the film cartridge around the film pre-winding take-up spool and also for winding back the exposed film after each exposure into the film cartridge. Therefore the direction of the built-in motor rotation should be different between the pre-winding of the unexposed film and winding back the exposed film into the film cartridge, and it is necessary to switch the direction of the built-in motor rotation for each case.

To accomplish such switching of the direction of motor rotation, the single use camera of the present invention uses a method of changing the position of the battery upside down in the battery chamber so that electricity flows from one way to the other depending on the positions of the poles of the battery in the battery chamber, and the directions of motor rotation can be switched also one direction to the other. To use the switching method as explained above, the battery chamber of the single use camera of the present invention has a specially designed battery chamber which has an ordinary spring contact at one side and two metal contacts of different kind on the other side, and by selecting one of the two metal contacts depending on the polarity of the battery inserted in, the direction of electricity flow is changed accordingly.

By changing the direction of the motor rotation, the direction of film running also changes from pre-winding direction, namely direction of film running out of the film cartridge to the film pre-winding take-up spool, to film wind-back direction, namely direction of film running back into the cartridge from the film pre-winding take-up spool.

The shutter charging and film travel distance control are usually done by using a sprocket wheel, which engages with the perforations of the film. While the film is moving for pre-winding, the sprocket wheel must turn freely along with the running film perforations, and should not do any shutter charging or film travel distance control (where to stop the film running). On the contrary while the film is moving back into the film cartridge, the sprocket must turn also along with the running film perforations, but this time while film is moving the sprocket must charge the shutter for next exposure, and must stop film running after each exposure working together with the shutter charging and sprocket control means. To achieve switching of the function of the sprocket wheel according to the film running directions or the direction of the motor rotation, the single use camera of the present invention has a simple mechanism that works as a shutter charging and releasing means including a sprocket wheel, which is turned by the moving film perforations in one direction while the film is being wound back into the film cartridge, and that can make the sprocket wheel move freely in the other direction with the moving film perforations without any kind of a clutch while the film is being pre-wound up around the film pre-winding take-up spool as well. This simple shutter-sprocket wheel control means works for multiple purposes like shutter charging, shutter releasing, switching the motor on and off, having the sprocket be free from shutter charging mechanism for pre-winding the film.

BRIEF DESCRIPTION OF THE DRAWINGS

FIG. 1 is a front perspective view of the motorized single use camera of one embodiment of the present invention;

FIG. 2-*a* is an exploded perspective rear view of the motorized single use camera of FIG. 1 with the back door opened;

FIG. 2-*b* is an exploded perspective rear view of the motorized single use camera of FIG. 1 with a film cartridge being placed in the film cartridge chamber;

FIG. 3 is an exploded perspective view of the gear train and motor of the motorized single use camera of FIG. 1;

FIG. 4 is a perspective rear view of the motorized single use camera with the battery cover opened showing the position for battery placements;

FIG. 4-*a* is an illustration to show battery placements for pre-winding and picture taking of the motorized single use camera of FIG. 1;

FIG. 4-*b* is a illustration to show the battery contacts provided in the battery chamber of the motorized single use camera of FIG. 1;

FIG. 5 is a circuit schematic of the motorized single use camera of FIG. 1 while the unexposed film is being pre-wound;

FIG. 5-*a* is a circuit schematic of the motorized single use camera of FIG. 1 after pre-winding completed showing the shutter release button not being;

FIG. 5-*b* is a circuit schematic of the motorized single use camera of FIG. 1 with the shutter charged;

FIG. 5-*c* is a circuit schematic of the motorized single use camera of FIG. 1 while the film is being advance;

FIG. 6-*a* is an exploded perspective view of the shutter-sprocket wheel control means of the motorized single use camera of FIG. 1, which is in a status where the shutter is charged, battery is placed in picture taking position and an unexposed film is positioned behind the exposure frame being ready for picture taking;

FIG. 6-*b* is an exploded perspective view of the shutter-sprocket wheel control means of the motorized single use camera of FIG. 1, which is in a status where the an unexposed film is being pre-wound around the pre-winding take-up spool;

FIG. 6-*c* an exploded perspective view of the shutter-sprocket wheel control means of the motorized single use camera of FIG. 1, which is in a status where the pre-winding of the unexposed film has been completed, but the battery is still in the pre-winding position in the battery chamber;

FIG. 6-*d* an exploded perspective view of the shutter-sprocket wheel control means of the motorized single use camera of FIG. 1, which is in a status where the shutter has been released but the shutter release button is not returned to the initial position yet;

FIG. 6-*e* is an exploded perspective view of the shutter-sprocket wheel control means of the motorized single use camera of FIG. 1, which is in a status where the film is being wound around to the take-up spool provided in the film cartridge after the shutter having been released;

FIG. 6-*f* is an exploded perspective view of the shutter-sprocket wheel control means of the motorized single use camera of FIG. 1, which is in a status where the film has been completely wound up into the film cartridge after the entire film having been exposed;

DETAILED DESCRIPTION OF THE INVENTION

Figure 7:
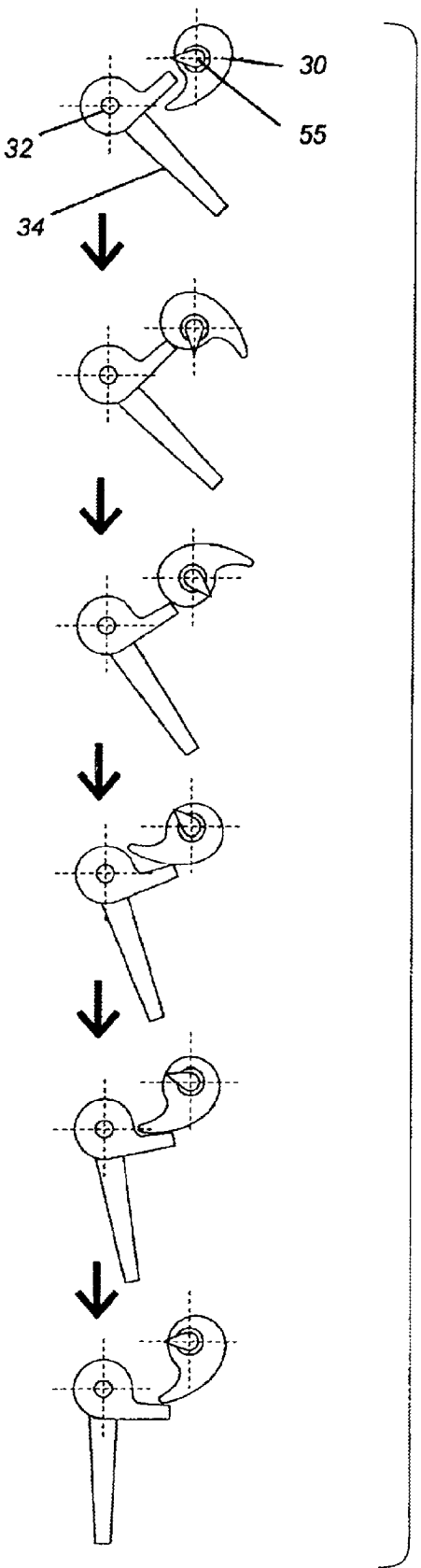
FIG. 7 are drawings to show the sequential and relative movements of the sprocket cam and cam following lever.

FIG. 1 shows a preferred embodiment of the present invention. The single use camera 1 comprises a main body section 2, a front cover section 3 and a back cover section 4. The main body section 2 is provided with a taking lens 5, a finder window 6, a flash window 7, and a shutter release button 8 in its outer walls, and necessary picture taking mechanisms such as a shutter mechanism, a motor 16 for film driving, a film advancing mechanism, and the like incorporated therein. The front cover section 3 is fixed to the main body section 2 in well known manner, for example by means of fixing screws. The back cover section 4 is fixed to the main body section 2 with a hinge 9 and can lock itself with the main body section 2. Thus by these three sections, namely the main body section 2, the front cover section 3 and the back cover section 4, the single use camera 1 is encased tightly in an outer casing which is formed with some openings for exposing the taking lens 5, finder window 6, flash window 7, shutter release button 8 and the like. FIG. 2-*a* and FIG. 2-*b* show the inside of the body of the single use camera 1 with its back cover section 4 opened. Inside the main body section 2, there are a film pre-winding take-up spool 10 and a film cartridge chamber 11 to receive a film cartridge 12 disposed on opposite sides of an exposure frame 13 as shown by FIG. 2-*a*. A fork 14 is provided projecting from the bottom wall of the film cartridge chamber 11, which is rotatable with a gear train 15 driven by a motor 16 built in the main body section 2 as shown by FIG. 3. When pre-loading the single use camera 1 with a new film 18 (which is a 135 size roll film and hereinafter referred to as the film for simplicity), the back cover section 4 is opened, and a film cartridge 12 is put in the film cartridge chamber 11, adjusting the position of the film cartridge 12 until the top of the film cartridge 12 is brought into engagement with the fork 14, and then the tip 17 of the film 18 is pulled out of the film cartridge 12 and placed over the film pre-winding take-up spool 10 as shown by FIG. 2-*b*.

After the back cover section 4 has been closed and locked, the battery chamber cover 21 is opened as shown by FIG. 4 and a 1.5 volt AA battery 22 is placed in the battery chamber 19 according to the indicated battery polarity marks 20-*a* for pre-winding as shown by FIG. 4-*a*, FIG. 5 and FIG. 5-*a*, and the battery chamber cover 21 is closed.

And instant that the shutter release button 8 is depressed, pre-winding of the film 18 starts being driven by the built-in motor 16 as shown in FIG. 6-*b*, and the film 18 is wound around the film pre-winding take-up spool 10, and pre-winding stops when the entire film 18 has been wound over the film pre-winding take-up spool 10. All these steps of film pre-winding can be done in daylight.

Before the single use camera 1 is delivered out of the factory, the battery 22 must be removed from and placed again in the battery chamber 19 in different polarity positions according to the indicated battery polarity marks 20-*b* for picture taking as shown by FIG. 4-*a*, FIG. 5-*b* and FIG. 5-*b* so that the film 18 can be wound back into the film cartridge 12 with the different directions of motor rotation and film running from the pre-winding status.

As explained above, in the single use camera 1 of the present invention, after the film pre-loading has been completed, it is necessary to switch the direction of motor rotation from pre-winding direction (which is hereinafter referred to as the pre-winding mode) to film winding back direction (which is hereinafter referred to as the picture-taking mode), and this switching can be done just by changing of the battery position in the battery chamber 19 upside down, in other words the switching can be made by changing the positions of battery polarities against the battery contacts 23, 25 and 26 provided in the battery chamber 19. The marks of polarities (+/−) are indicated in or beside the battery chamber 19 accordingly for both battery positions of the pre-winding mode and picture-taking mode as shown by FIG. 4 and 4-*a*. Consequently the circuit and film driving mechanism by the motor 16 of the single use camera 1 of the present invention is so designed as to get the motor 16 to rotate to drive the film 18 in the pre-winding direction when the battery 22 is placed in the position of the pre-winding, or to get the motor 16 to rotate to drive the film 18 in the picture taking direction, namely in the direction of the film running back into the film cartridge 12, when the battery 22 is placed in the position of the picture taking.

One of the battery contacts in the battery chamber 19 is an ordinary metal plate spring contact 23 as shown in FIG. 4-*a*. The other one has a recessed area 24 (a concave area like a hole) where the two different metal contacts 25 and 26 are fixed as shown also in FIG. 4-*b*. A metal contact A 25, which is a metal plate type, is provided behind the recessed area 24 and another metal contact B 26, which is a metal boss type, is provided at the front rim of the recessed area 24 as shown by FIG. 4-*b*. Only the plus pole of the battery 22 can contact with the metal contact A 25 provided behind the recessed area 24 when the battery 22 is placed in the position of the picture taking mode according to the picture taking polarity marks 20-*b* indicated in the battery chamber 19 as shown by FIG. 4-*a*, FIG. 5-*b* and FIG. 5-*b*. On the contrary, with the metal contact B 26 provided at the front rim of the recessed area 24 only the minus pole of the battery 22 can contact when the battery 22 is placed in the position of the pre-winding mode according to the pre winding mode polarity marks 20-*a* indicated in the battery chamber 19 as shown by FIG. 4-*a*, FIG. 5 and FIG. 5-*a*.

Consequently the motor circuit of the single use camera 1 of the present invention is so designed as for electricity to flow through two different circuits depending on which pole of the battery 22, plus or minus, contacts with which one of the two metal contacts 25 or 26 provided at the recessed area 24 in the battery chamber 19, that is to say by turning the position of battery 22 in the battery chamber 19 upside down it becomes possible to switch the circuit from the pre-winding motor rotation to picture taking motor rotation without having any switch to change the direction of motor rotation. Refer to FIG. 5-*a* for pre-winding and FIG. 5-*c* for picture taking.

FIG. 6-*a* shows a preferred embodiment of the shutter-sprocket control means of the single use camera 1 of the present invention. The film 18 runs in the direction shown by an arrow in FIG. 6-*a*. Engaging with the perforations 28 of the film 18, a sprocket wheel 27 is provided at one end of sprocket wheel axle 29, and on the other end of the sprocket wheel axle 29 a sprocket cam 30 is provided. Above the sprocket wheel 27, there is a sprocket disk 31 provided also on the sprocket wheel axle 29 as a part of the sprocket wheel 27. Touching and following the side periphery of the sprocket cam 30, a cam following lever 32 is provided at the upper end of main axle 33 of the shutter-sprocket wheel control means, which is loaded with a main axel coil spring 57 getting spring tension upward, and at the lower end of the main axle 33, a shutter setting lever 34 is provided. While the cam following lever 32 is touching the side periphery of the sprocket cam 30, the sprocket wheel 27 couples with the shutter charging mechanism, and if the film 18 runs in the direction shown by an arrow in FIG. 6-*a*, the sprocket wheel 27 turns counterclockwise along with the moving perforations 28 of the film 18 and the sprocket cam 30 rotates also counterclockwise, then the cam following lever 32 rotates clockwise following the side periphery of sprocket cam 30 with the main axle 33 which also rotates clockwise, and at the same time the shutter setting lever 34 also rotates clockwise. Above and beside the cam following lever 32 a shutter release button 8 is provided, and underneath the shutter release button 8 a center spring contact 43 is provided which pushes the shutter release button always up. The tip of the center spring contact 43 is located to touch the upper surface of the cam following lever 32 so that when the shutter release button 8 is depressed, the cam following lever 32 and the main axle 33 of the shutter-sprocket control means go downwardly, too, letting the cam following lever 32 be free from the side periphery of the sprocket cam 30.

A shutter actuator 37 is provided, with which the tip 41 of the shutter setting lever 34 couples at a cutout slot 42 provided on the shutter actuator 37. The shutter actuator 37 moves sliding right and left along with a guide pin 38 located in and engaged with the slot-rail 39 provided at one end of the shutter actuator 37. The shutter actuator 37 is loaded with a shutter charging spring 40, and it is held at its charged position being blocked by the tip 41 of the shutter setting lever 34, which is also blocked by sprocket cam 30 which stops the movement of cam following lever 34 and the main axle 33.

When the cam following lever 32 and the main axle 33 come free from the blocking made by the sprocket cam 30, the shutter setting lever 34 is also free, and the shutter actuator 37 runs immediately to the right toward the shutter 52 without receiving any resistance from the tip 41 of the shutter setting lever 34. When the shutter release button 8 is depressed, the cam following lever 32 comes down to be free from the sprocket cam 30, and as the main axle 33 is free as well, the shutter setting lever 34 comes free to turn counterclockwise, too, and the shutter actuator 37 immediately runs to the right by the force of shutter charging spring 40, and the tip 53 of the shutter actuator hits the head of the shutter blade 51 to open the shutter 52 and runs further to get over the head of the shutter blade 51 after releasing the shutter 52 so that the shutter blade 51 may return to the initial position to close the shutter 52. Coupling with the shutter actuator 37, there is a lever actuator 35 provided, and the lever actuator 35 controls a sprocket switch center contact 46. One end 35-*a* of the lever actuator 35 comes out through a small rectangular slot-window 58 which is provided on a shutter mechanism base 59 in the running path of the tip 53 of the shutter actuator 37. At the other end of the lever actuator 35 a projection 35-*b* like a boss is formed as a part of the lever actuator 35, and the lever actuator 35 is supported for pivotal movement by means of a pivot 60 and the both ends of the lever actuator 35 move in the pivotal movement. After the shutter being opened and closed by the shutter actuator 37, the tip 53 of the shutter actuator 37 runs farther and hits the end 35-*a* of the lever actuator 35 and stops at that position.

As the end 35-*a* is moving to the right being hit by the tip 53 of the shutter actuator 37, the lever actuator 35 rotates counterclockwise, and consequently the projection 35-*b* of the lever actuator 35 moves counterclockwise as well along with the pivotal movement of the lever actuator 35 in counterclockwise direction. The projection 35-*b* is so located as to push the sprocket switch center contact 46 when it moves in an counterclockwise direction, and the sprocket switch center contact 46 moves toward an on-contact of sprocket switch 48, which is provided with an off-contact of sprocket switch 47 just like sandwiching the sprocket switch center contact 46 between them, and the sprocket switch center contact 46 touches the on-contact of sprocket switch 48 to turn on the sprocket switch (46 & 48). Now the shutter-sprocket wheel control means is in a status in which the shutter release button 8 is still being depressed, the shutter 52 is closed but not charged by the shutter charging spring 40 yet as shown by FIG. 6-*d*.

The tip 41 of the shutter setting lever 34 is engaged with a cutout slot 42 provided beside the slot-rail 39 on the shutter actuator 37. If the cam following lever 32 touches the sprocket cam 30 while the sprocket cam is rotating counterclockwise with sprocket wheel 27, the cam following lever 32 turns clockwise touching and following the side periphery of sprocket cam 30 as shown in FIG. 7, which shows the sequential and relative movements of the sprocket cam 30 and cam following lever 32. And then the shutter setting lever 34 turns also clockwise, and the tip 41 of the shutter setting lever 34 pushes the shutter actuator 37 to the left charging the shutter charging spring 40 in full tension so that the shutter 52 is charged. While the sprocket cam 30 is rotating counterclockwise, the sprocket disk 31 is also rotating in the same direction, and the bent corner 49 of the sprocket switch center contact 46 is touching the cylindrical side periphery of the sprocket disk 31, the bent corner 49 keep touching and following the cylindrical side periphery of the sprocket disk 31. When the shutter is charged and the bent corner 49 of the sprocket switch center contact 46 gets into the ditch 50 provided on the sprocket disk 31 and stays there, the sprocket switch center contact 46 detaches the on-contact of sprocket switch 48 and touches the off-contact of sprocket switch 47, and the film 18 stops running.

There are some switch contacts are provided with the shutter-sprocket control means. Underneath the shutter release button 8 a center spring contact 43 is provided which pushes the shutter release button always up. Above the center spring contact 43 and between the shutter release button axle and the cam following lever 32, a shutter release switch on-contact 44 is provided which always touches the center spring contact 43 unless the shutter release button 8 is depressed. On the opposite side of the shutter release switch on-contact 44, and also between the shutter release button axle and the cam following lever 32 there is a pre-winding switch on-contact 45 provided, which does not touch the center spring contact 43 unless the shutter release button 8 is depressed. The shutter release switch on-contact 44 and the pre-winding switch on-contact 45 are located just like sandwiching the center spring contact 43 between them. If the shutter release button 8 is depressed, the pre-winding switch 45 turns on, and the shutter release switch 44 is always on whenever the shutter release button 8 is not depressed. As mentioned hereinbefore there are provided two more switch contacts sandwiching the sprocket switch center contact 46. One is the off-contact of sprocket switch 47 and the other is the on-contact of sprocket switch 48.

And the circuit is so designed as for the motor 16 to be stopped regardless of the on/off positions of all the switches built in the shutter-sprocket wheel control means, namely shutter release switch, sprocket switch and the pre-winding switch, when the battery 22 is placed in the pre-winding mode as shown by FIG. 4-a and the shutter release button 8 is not being depressed. Refer to FIG. 5-a.

After the pre-loading of the film 18 has been completed as explained hereinbefore, the shutter release button 8 should be returned to the initial position by detaching the depressing finger from the shutter release button 8, and the main axle 33 of the shutter-sprocket wheel control means also returns by spring tension by the main axle coil spring 57 to the initial position. FIG. 6-c shows the shutter-sprocket wheel control means in the status in which the shutter release button 8 has returned up to the initial position but the shutter is not charged yet; the main axle 33 of the shutter-sprocket wheel control means has moved back upward; the pre-winding switch is off, the shutter release switch is on; and the sprocket switch is on; but the battery 22 is still in the pre-winding mode in the battery chamber 19. Since the battery 22 is still in the pre-winding mode, the motor 16 is stopped with the pre-winding switch 45 being off. Refer to FIG. 5-a.

Now the single use camera 1 must be put in the picture taking mode, and the battery 22 must be removed from and placed again in the battery chamber 19 in different polarity positions according to the indicated polarities for picture taking mode as shown by FIG. 4-a to change the pre-winding mode of the single use camera 1 to the picture taking mode. Since the shutter release switch and the sprocket switch are on as shown by FIG. 6-c and FIG. 5-a with the shutter release button 8 being at its initial position (up-position), instant that the battery position has been changed from the pre-winding mode to picture taking mode, electricity flows through the shutter release switch and sprocket switch as shown by FIG. 5-c and the motor 16 starts rotating, and the film 18 starts moving in a direction shown by an arrow in FIG. 6-e, and the sprocket wheel 27 and the sprocket cam 39 rotate counterclockwise along with the moving film. Then the main axle 33 of the shutter-sprocket control means rotates clockwise as the cam following lever 32 starts rotating clock-wise to follow the side periphery of the sprocket cam 30 that is rotating counterclockwise along with the rotation of the sprocket wheel 27. At the same time, shutter setting lever 34 starts turning clockwise, and the shutter setting lever 34 pulls the shutter actuator 37 back to the initial position, where the shutter actuator 37 is locked with the fully charged the shutter charging spring 40 and held by the tip 41 of the shutter setting lever 34 which engages with cutout slot 42 of the shutter actuator 37. Simultaneously with the start of the movement of the shutter actuator 37 in a clockwise direction, the lever actuator 35 comes free from the shutter actuator 37 as shown in FIG. 6-e and turns clockwise. Then the projection 35-b stops pushing the sprocket switch center contact 46 detaching itself from the sprocket switch center contact 46, and by spring tension of its own the sprocket switch center contacts 46 touches the cylindrical side periphery of the sprocket disk 31 with the bent corner 49, and the bent corner 49 keeps touching the cylindrical side periphery of the sprocket disk 31 while the sprocket disk 31 is rotating along with the rotation of the sprocket wheel 27 until the bent corner 49 drops into the ditch 50 provided on the cylindrical side periphery of the sprocket disk 31.

Instant that the bent corner 49 of the sprocket switch center contact 46 drops into the ditch 50 provided on the cylindrical side periphery of the sprocket disk 31, the whole sprocket switch center contact 46 moves toward the sprocket wheel axle 29, and the sprocket switch center contact 46 comes off the on-contact of sprocket switch 48 and stops at the off-contact of sprocket switch 47 and the motor 16 is stopped.

The travel distance of the sprocket wheel 27 from the start to the stop, namely one full rotation of the sprocket wheel, is designed to match the travel distance of one frame of the film 18 exactly (by 8 sprocket wheel teeth rotation). When the sprocket wheel 27 stops after one frame film running, one new unexposed frame of the film 18, which has been pulled out of the film pre-winding take-up spool 10, is positioned behind the exposure frame 13 disposed between the film pre-winding take-up spool 10 and the film cartridge 12, and the single use camera 1 is now ready for delivery and for picture taking.

After the film pre-winding having been finished and the battery 22 having been placed in the battery chamber 19 as shown by FIG. 4-a and FIG. 5-b for the picture taking mode as described hereinbefore, a new unexposed frame (the first frame of unexposed film) is positioned behind the exposure frame 13 between the film pre-winding take-up spool 10 and the film cartridge 12, and the shutter is charged. Therefore, when the single use camera 1 of the present invention comes out of the production line, the shutter-sprocket wheel control means is always in the status in which the shutter 52 is charged, the first unexposed frame is positioned behind the exposure frame 13, the shutter release switch (43 & 44) is on, and the sprocket switch is off (46 & 47) as shown by FIG. 6-a and FIG. 5-b.

In the status of the shutter-sprocket wheel control means as shown by FIG. 6-a, when the shutter release button 8 is depressed, the cam following lever 32 comes down to be free from the sprocket cam 30, and as the main axle 33 is free as well, the shutter setting lever 34 comes free to turn counterclockwise, too, and the shutter actuator 37 immediately runs to the right by the force of shutter charging spring 40, and the tip 53 of the shutter actuator hits the head of the shutter blade 51 to open the shutter 52 and runs further to get over the head of the shutter blade 51 after releasing the shutter 52 so that the shutter blade 51 may return to the initial position to close the shutter 52.

Coupling with the shutter actuator 37, there is a lever actuator 35 provided, and the lever actuator 35 controls a sprocket switch center contact 46. One end 35-a of the lever actuator 35 comes out through a small rectangular slot-window 58, which is provided on a shutter mechanism base 59 in the running path of the tip 53 of the shutter actuator 37. At the other end of the lever actuator 35 a projection 35-b like a boss is formed as a part of the lever actuator 35, and the lever actuator 35 is supported for pivotal movement by means of a pivot 60 and the both ends of the lever actuator 35 move in the pivotal movement. After the shutter being opened and closed by the shutter actuator 37, the tip 53 of the shutter actuator 37 runs farther and hits the end 35-a of the lever actuator 35 and stops at that position.

As the end 35-a is moving to the right being hit by the tip 53 of the shutter actuator 37, the lever actuator 35 rotates counterclockwise, and consequently the projection 35-b of the lever actuator 35 moves counterclockwise as well along with the pivotal movement of the lever actuator 35 in counterclockwise direction. The projection 35-b is so located as to push the sprocket switch center contact 46 when it moves in an counter-clockwise direction, and the sprocket switch center contact 46 moves toward an on-contact of sprocket switch 48, which is provided with an off-contact of sprocket switch 47 just like sandwiching the sprocket switch center contact 46 between them, and the sprocket switch center contact 46 touches the on-contact of sprocket switch 48 to turn on the sprocket switch (46 & 48).

Now the sprocket switch (46 & 48) is on but as stated hereinbefore the shutter release switch (43 & 44) is off because the shutter release button 8 is still depressed keeping the center contact of the shutter and pre-winding switches 43 apart from the shutter release switch on-contact 44 as shown in FIG. 6-d.

Now that the shutter 52 has been released, the next unexposed frame of the film 18 must be positioned. When the depressing finger is detached from the shutter release button 8, instantly the shutter release switch (43 & 44) turns on having the center contact of the shutter and pre-winding switches 43 touch the shutter release switch on-contact 44.

Since the sprocket switch (46 & 48) is already on, now electricity flows through the shutter release switch and sprocket switch as shown by FIG. 5-c and the motor 16 starts rotating, and the film 18 starts moving in a direction shown by an arrow in FIG. 6-e, and the sprocket wheel 27 and the sprocket cam 39 rotate counterclockwise along with the moving film. Then the main axle 33 of the shutter-sprocket control means rotates clockwise as the cam following lever 32 starts rotating clockwise to follow the side periphery of the sprocket cam 30 that is rotating counterclockwise along with the rotation of the sprocket wheel 27.

At the same time, shutter setting lever 34 starts turning clockwise, and the shutter setting lever 34 pulls the shutter actuator 37 back to the initial position, where the shutter actuator 37 is locked with the fully charged the shutter charging spring 40 and held by the tip 41 of the shutter setting lever 34 which engages with cutout slot 42 of the shutter actuator 37. Simultaneously with the start of the movement of the shutter actuator 37 in a clockwise direction, the lever actuator 35 comes free from the shutter actuator 37 as shown in FIG. 6-e and turns clockwise.

Then the projection 35-b stops pushing the sprocket switch center contact 46 detaching itself from the sprocket switch center contact 46, and by spring tension of its own the sprocket switch center contacts 46 touches the cylindrical side periphery of the sprocket disk 31 with the bent corner 49, and the bent corner 49 keeps touching, the cylindrical side periphery of the sprocket disk 31 while the sprocket disk 31 is rotating along with the rotation of the sprocket wheel 27 until the bent corner 49 drops into the ditch 50 provided on the cylindrical side periphery of the sprocket disk 31.

Instant that the bent corner 49 of the sprocket switch center contact 46 drops into the ditch 50 provided on the cylindrical side periphery of the sprocket disk 31, the whole sprocket switch center contact 46 moves toward the sprocket wheel axle 29, and the sprocket switch center contact 46 comes off the on-contact of sprocket switch 48 and stops at the off-contact of sprocket switch 47 and the motor 16 is stopped.

As stated hereinbefore, the travel distance of the sprocket wheel 27 from the start to the stop, namely one full rotation of the sprocket wheel, is designed to match the travel distance of one frame of the film 18 exactly (by 8 sprocket wheel teeth rotation). When the sprocket wheel 27 stops after one frame film running, one new unexposed frame of the film 18, which has been pulled out of the film pre-winding take-up spool 10, is positioned behind the exposure frame 13 disposed between the film pre-winding take-up spool 10 and the film cartridge 12.

Now the shutter-sprocket wheel control means has returned to the previous status of FIG. 6-a in which the shutter is charged, a new unexposed frame of the film 18 is positioned behind the exposure frame 13 and the single use camera 1 is ready for the next picture taking.

As mentioned so far, in the single use camera 1 of the present invention, the up-down movement of the main axle 33 of the shutter-sprocket wheel control means caused by the up-down movement of the shutter release button 8 controls almost all the necessary procedures of the operation such as to keep the sprocket wheel 27 free from shutter charging and releasing mechanism for film pre-winding, to couple the sprocket wheel 27 with the shutter charging and releasing mechanism for picture taking rotating along with the moving film perforations 28, to turn on and off all the switches to control the motor 16.

As shown in FIG. 6-a, an exposure counting gear 54 is provided engaging with a counting gear driving claw 55 that is formed as a part of the sprocket cam 30. As stated hereinbefore, one full rotation of the sprocket wheel 27 winds up one full frame of the film 18, and the counting gear driving claw 55 is so designed as to advance one tooth of the exposure counting gear 54 per one full rotation of the sprocket wheel 27 and sprocket cam 30. The number of teeth of the exposure counting gear 54 is so designed as to be the same as the exposure number of the film 18, and the figures from 1 to the final number of the exposure for instance like 27 in the case of 27 exposure film are printed on the rim of the upper surface of the exposure counting gear 54 arranging each number of exposure to match accordingly to one of the teeth of the exposure counting gear 54 so that when the first frame is exposed, the FIG. 1 comes to the indicator and the exposure counting can be made that way to the last frame, of which number comes to the indicator when the last frame is exposed.

After the last frame has been exposed, all the exposed frames of the film 18 have been wound back into the film cartridge 12, and if the motor 16 still runs after the end of the film has come off the film pre-winding take-up spool 10, the film will be wound back into the film cartridge 12 totally and yet the motor 16 does not stop running. To prevent this unnecessary motor running even after the entire film 18 having been wound back into the film cartridge 12, there is a film sensing switch 56 provided beside the upper edge of the exposure frame 13 as shown in FIG. 6.

The film sensing switch 56 is depressed by the film 18 while the film is running between the film pre-winding take-up spool 10 and the film cartridge 12 over the film sensing switch 56 and always turns on to run the motor 16 while it is being depressed by the film 18. When the last end of the film 18 comes off the film pre-winding take-up spool 10 and passes over the exposure frame 13 and the film sensing switch 56, the film sensing switch is not depressed by the film anymore, and it comes out by spring tension and turns off to stop the motor 16. Thus the motor 16 stops after the last end of the film 18 passes over the film sensing switch 56.

What is claimed is:

1. A camera usable as a single use camera, having a motor to advance film, where an unexposed film wound up around a pre-winding take-up spool can be disposed at one side of a lens of the camera, comprising:

a removable film cartridge having a film take-up spool therein being disposed on the other side of the lens, with one end of the unexposed film attached to the film take-up spool;

a sprocket wheel driven by movement of the film to manage a shutter charging member; and a sprocket wheel control member driven by movement of a shutter release button, for getting the sprocket wheel to be free from or coupled with the shutter charging member.

2. The camera as defined in claim 1, further comprising a means for changing direction of motor rotation, with which three battery contacts are provided for one battery so that by selecting two of the three contacts for one battery, direction of motor rotation can be reversed.

3. The camera as defined in claim 2, wherein the means for changing direction of motor rotation is a battery chamber.

4. The camera as defined in claim 1, wherein the sprocket wheel is free from the shutter charging member and can rotate in a direction of film pre-winding when the shutter release button is depressed.

5. The camera as defined in claim 1, wherein the sprocket wheel is coupled with the shutter charging member and can rotate only in a direction of winding film back into the film cartridge when the shutter release button is not depressed.

* * * * *